United States Patent
van der Burgt et al.

(10) Patent No.: US 6,263,661 B1
(45) Date of Patent: *Jul. 24, 2001

(54) SYSTEM FOR POWER GENERATION (75) Inventors: Maarten Johannes van der Burgt, Akersloot; Jacobus van Liere, Doorwerth, both of (NL)

(73) Assignee: N.V. Kema (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,671

(22) Filed: Feb. 17, 1998

(30) Foreign Application Priority Data

Feb. 17, 1997 (EP) .................................................. 97.200463
Jul. 22, 1997 (EP) .................................................. 97.202268

(51) Int. Cl.[7] ...................................................... F02C 1/00
(52) U.S. Cl. .......................................... 60/39.17; 60/39.511
(58) Field of Search ............................... 60/39.17, 39.511

(56) References Cited

U.S. PATENT DOCUMENTS

| | | | |
|---|---|---|---|
| 3,369,361 | * | 2/1968 | Craig ........................................ 60/39.5 |
| 3,657,879 | * | 4/1972 | Ewbank et al. ....................... 60/39.05 |
| 3,978,661 | * | 9/1976 | Cheng ................................... 60/39.55 |
| 4,498,289 | * | 2/1985 | Osgerby ................................ 60/39.52 |
| 5,775,091 | * | 7/1998 | Bannister et al. .................... 60/39.05 |
| 5,953,900 | * | 9/1999 | Bannister et al. .................... 60/39.05 |

FOREIGN PATENT DOCUMENTS

| | | |
|---|---|---|
| 0444913 | 9/1991 | (EP) . |
| 0505263 | 9/1992 | (EP) . |
| 1007140 | 5/1952 | (FR) . |
| 1467142 | 12/1966 | (FR) . |
| 1284335 | 8/1972 | (GB) . |

* cited by examiner

Primary Examiner—Timothy S. Thorpe
Assistant Examiner—Ehud Gartenberg
(74) Attorney, Agent, or Firm—Webb Ziesenheim Logsdon Orkin & Hanson, P.C.

(57) ABSTRACT

A system for power generation comprising a turbine system and a power generating system connected to said turbine system, wherein said turbine system comprises:

a compressor and inlet means for supplying fluid to said compressor for cooling said oxygen-containing gas;

a combustion means;

a gas turbine;

a recuperator connected with outlet of said compressor means, and the outlet for exhaust gases of said gas turbine means, for mutual heat exchange;

means for at least partially condensing water from the exhaust gases from said gas turbine means, said condensing means being connected with said outlet for exhaust gases of said gas turbine and further provided with an outlet for condensate and an outlet for discharging the remaining gas.

19 Claims, 6 Drawing Sheets

SYSTEM FOR POWER GENERATION

BACKGROUND OF THE INVENTION

The present invention relates to a system for power generation. Such systems generally comprise a turbine system, comprising both gas turbines and steam turbines, and a power generating system. At present the efficiency of the best known systems for power generation is about 55–60%. In such systems for power generation there is a need to improve their performance and their efficiency. It is an object of the present invention to provide a system for power generation having an increased efficiency, in particular above 55% and more in particular 58–62%.

SUMMARY OF THE INVENTION

The invention therefore provides a system for power generation comprising a turbine system and a power generating system connected to said turbine system, wherein the turbine system comprises:

a) a compressor means connected with an inlet for oxygen-containing gas, an outlet for compressed oxygen-containing gas and an inlet means for supplying fluid to said compressor means for cooling the oxygen-containing gas;

b) a combustion means provided with a fuel inlet and a flue gas outlet, said combustion means being connected with the outlet for compressed oxygen-containing gas of the compressor means;

c) a gas turbine means connected with said flue gas outlet of the combustion means and being provided with an outlet for exhaust gases;

d) a recuperator means connected with the outlet for compressed oxygen-containing gas of the compressor means, and with the outlet for exhaust gases of the gas turbine means, for mutual heat exchange;

e) at least a means for at least partially condensing water from the exhaust gases from the gas turbine means, said means for condensing being connected with the outlet for exhaust gases of the gas turbine means and further provided with at least an outlet for condensate and an outlet for discharging the remaining gas.

The cooling of said oxygen-containing gas with the fluid may be carried out directly or indirectly, during and/or after at least one compressor stage. For indirect cooling the fluid may be any conventional gaseous or liquid coolant, such as freon, water and air. For direct cooling the fluid may be water, methanol, ethanol and the like.

Advantageously, according to the invention the condensate in the condensate outlet has a temperature of ambient or above ambient or a temperature below ambient, e.g. 1–15° C.

In another advantageous embodiment of the present invention the fluid is supplied directly to the oxygen-containing gas during and/or after compression wherein the cooling is essentially obtained by evaporation of the fluid.

In still another advantageous embodiment of the invention the condensate is injected into the oxygen-containing gas during and/or after compression. This is particularly important in locations in which water required for that operation will constitute a supply problem. Preferably, therefor recuperator means are further connected with the fuel inlet of said combustion means for heat exchange, resulting in a further increase of the efficiency with 0.5.

More advantageously, the exhaust gases from the gas turbine means are expanded in at least one condensing turbine.

In another advantageous embodiment of the invention at least part of the exhaust gases from the condensing means are recycled to the inlet of the oxygen-containing gas of the compressor means.

Still more advantageously, at least part of the exhaust gases from the condensing means are recycled to a heat exchange means for heat exchange with the oxygen-containing gas supplied to the inlet for oxygen-containing gas of the compressor means.

In another advantageous embodiment of the present invention part of the exhaust gases from the condensing means are directly recycled to the inlet of the oxygen-containing gas of the compressor means and another part is recycled to a heat exchange means for heat exchange with the oxygen-containing gas supplied to the inlet for oxygen-containing gas of the compressor means.

Further, advantageously, the exhaust gas from a first condensing turbine is further expanded in at least a second condensing turbine. At least part of the exhaust gases from the turbine system are advantageously expanded to a pressure of 0.2–0.8 bara.

Advantageously, according to the invention the relatively cold condensate or gas is applied for cooling purposes and heat developed in the process is applied for heating purposes.

Preferably fluid to be supplied to the compressor is atomized in the oxygen-containing gas to be fed to the compressor means.

BRIEF DESCRIPTION OF THE DRAWINGS

The present invention will now be described in more detail by way of example by reference to the accompanying drawing, in which.

DESCRIPTION OF THE PREFERRED EMBODIMENTS

Figure 1:
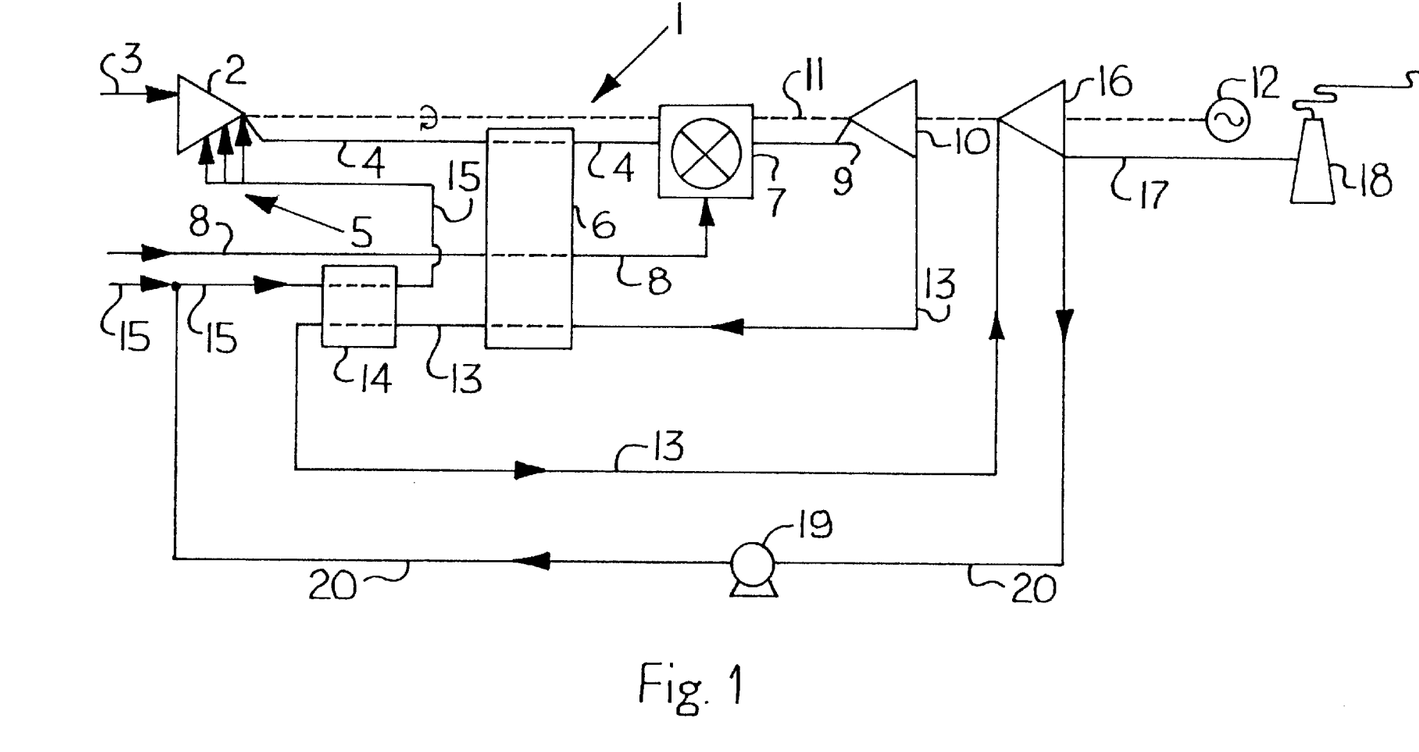
FIG. 1 represents schematically a power generating system according to the present invention.

FIG. 1 shows a power generating system 1 according to the present invention. The power generating system 1 comprises a compressor means 2 provided with an inlet for oxygen-containing gas 3, an outlet for compressed oxygen-containing gas 4 and a water inlet means 5 for quasi-isothermal compression of oxygen-containing gas in the compressor means 2. It is noted, that the water inlet means 5 may be arranged such that for the quasi-isothermal compression of oxygen-containing gas water is added in and/or after the compressor means 2. The water inlet means 5 are designed as required for the compressor means 2. That is, the compressor means 2 may consist of one compressor with several compression stages and one or more of these stages are provided with water inlet means and/or water is injected after one or more compressor-stages. Alternatively the compressor means 2 may consist of several consecutive compressors provided with water injection means during or after each compressor in such a way that the compression is carried out quasi-isothermally. The compressed oxygen-containing gas outlet 4 passes through a recuperator 6 for heat exchange and is connected to a combustion means 7 which is also provided with a fuel inlet 8 and a flue gas outlet 9.

The compressed flue gas present in the flue gas outlet is expanded in a gas turbine means 10 mounted on a shaft 11 for driving the compression means 2 and connected to the generator 12 for power generation. The expanded gas leaves the gas turbine means 10 via a turbine exhaust gas outlet 13 and passes through the recuperator 6. Accordingly, heat exchange is effected between the hot exhaust gas (550° C.) from the gas turbine means flowing through duct 13 and the fuel (25° C.) in the fuel duct 8 and the compressed oxygen-containing gas in the compressed oxygen-containing gas duct 4.

Subsequently, the turbine exhaust gas outlet 13 passes through a water inlet heat exchange means 14 for heat exchange of water supplied via the water inlet 15. Accordingly, the water temperature is raised from 25° C. to about 200° C.

Finally, the cooled exhaust gas of 100–250° C. is supplied to a condensing turbine means 16 in which the exhaust gas is expanded further in this case to a pressure of 1 bara resulting in water condensation. The remaining cooled exhaust gas is supplied via an exhaust gas exit 17 to a stack 18. The formed condensate is recycled via the pump 19 and the condensate recycling pipe 20 to the water inlet 15.

Figure 2:
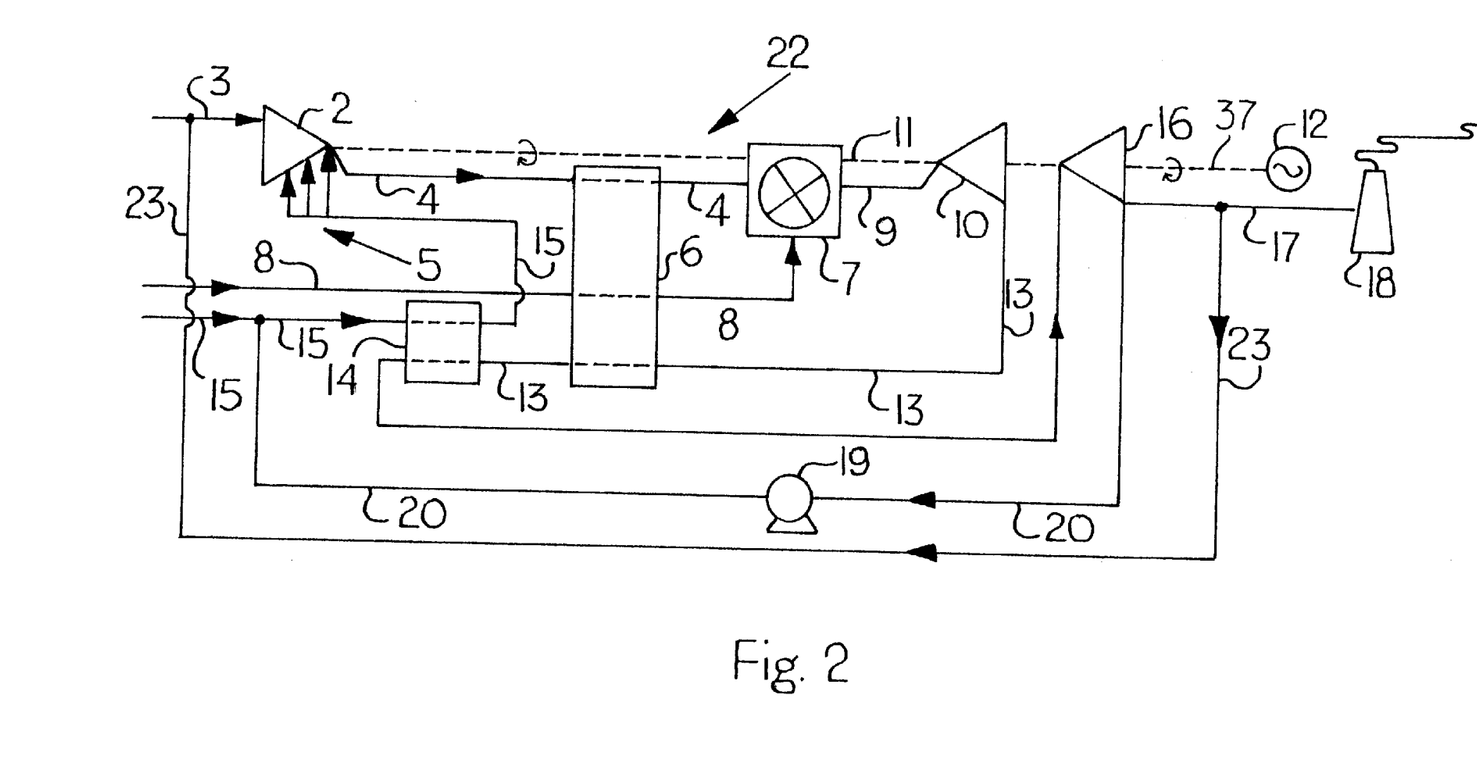
FIG. 2 represents schematically an advantageous embodiment of the present invention.

FIG. 2 shows another power generating system 22. Equivalent means and other equipment items are referred to by the same reference numbers.

In contrast to the power generating system 1 of FIG. 1, in the power generation system 22 of FIG. 2, part of the exhaust gas leaving the condensing turbine means 16 is recycled via the exhaust gas recycling duct 23 to the oxygen-containing gas inlet 3.

Figure 3:
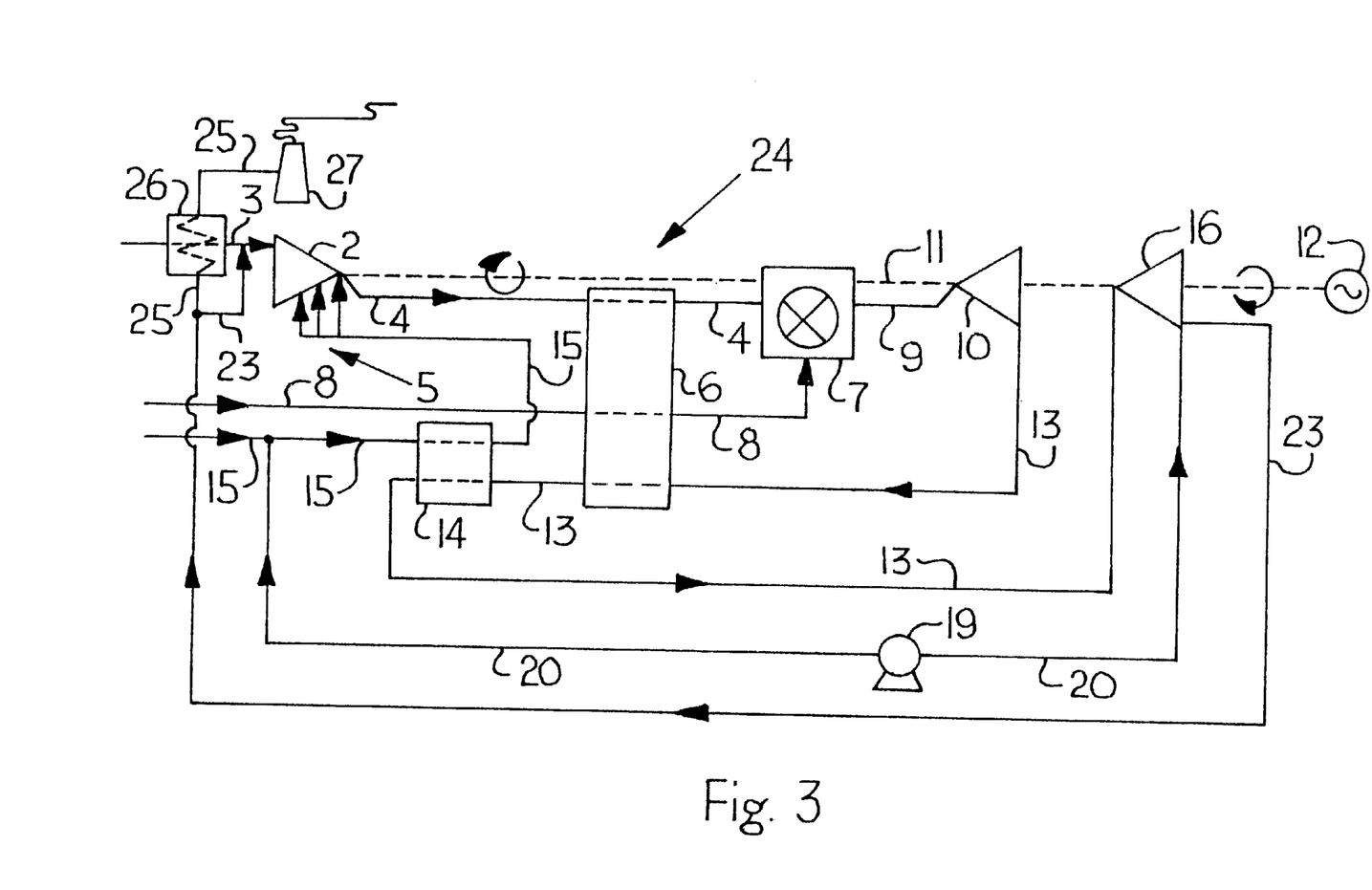
FIG. 3 represents schematically another advantageous embodiment of the present invention.

FIG. 3 shows a power generating system 24 according to the present invention, which comprises an exhaust recycling gas duct 23 connected to the oxygen-containing gas outlet 3, whereas the remainder of the exhaust gas is branched off via duct 25 and to a heat exchange unit 26 for heat exchange with oxygen-containing gas supplied via the oxygen-containing inlet 3, after which the exhaust gas is released via stack 27.

Figure 4:
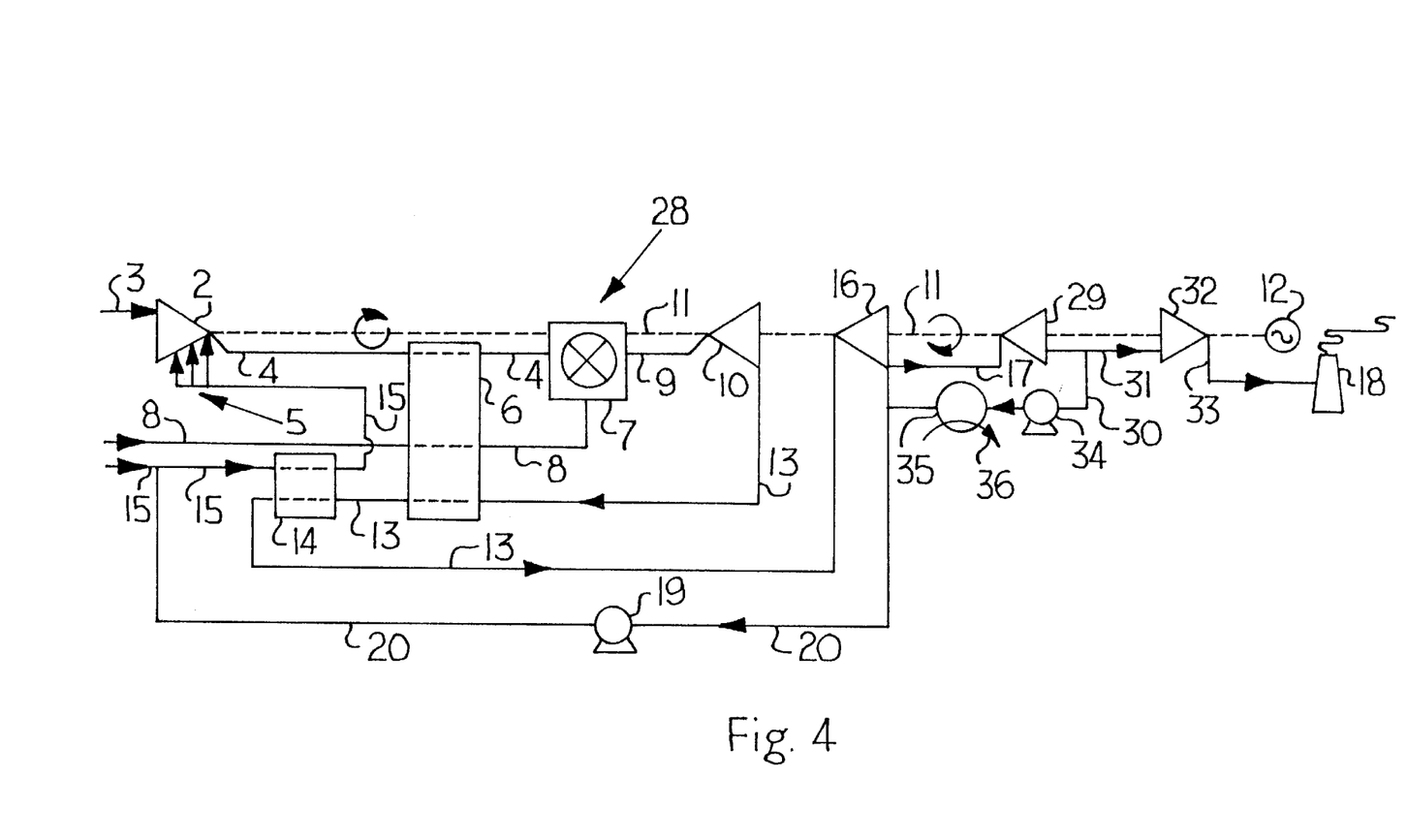
FIG. 4 represents schematically still another advantageous embodiment of the present invention.

FIG. 4 shows a power generating system 28 having a lay-out similar to the power generating system 1 of FIG. 1. However, the power generating system 28 of FIG. 4 comprises a condensing turbine system consisting of a first condensing turbine 16 expanding exhaust gas to atmospheric pressure, and a subsequent second condensing turbine 29 further expanding the exhaust gas to 0.4 bara. Relatively cold condensate (5° C.) is removed via condensate pipe 30. The exhaust gas leaving the second condensing turbine 29 via the duct 31 is supplied to a compressor 32 for compressing exhaust gas to atmospheric pressure prior to release via duct 33 and stack 18 to the atmosphere.

Cold condensate is pumped via pump 34 through a heat exchange means 35 and the relatively warm condensate (25° C.) is supplied to the condensate recycling pipe 20.

In the heat exchange means 35 air 36 is cooled. This cooled air may be used for space cooling.

Figure 5:
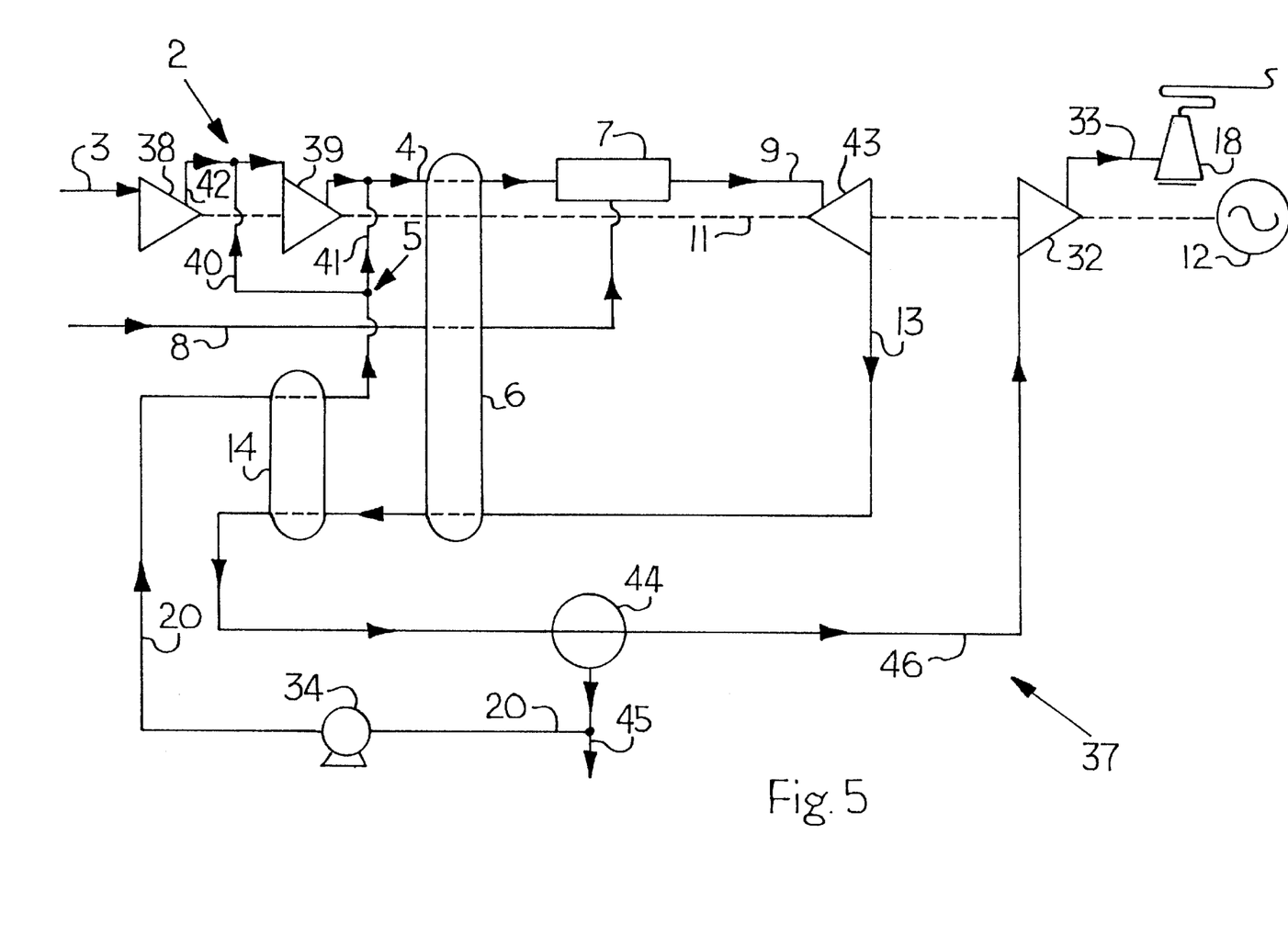
FIG. 5 represents schematically a further advantageous embodiment of the present invention.

FIG. 5 shows a power generating system 37 according to the present invention. The compressor means comprises two compressors 38 and 39 for compressing oxygen-containing gas in a first stage to 3 bar and in a second stage to 9 bar. For quasi-isothermal compression water is added after each compression stage. To that end the water inlet means 5 comprises water inlets 40 and 41 supplying water to the outlet 42 of the compressor 38 and the outlet 4 of compressor 39, respectively.

The gas turbine means 43 expands the flue gas from the combustion means to subatmospheric pressure (about 0.6 bara (700° C.)). After heat exchange in the recuperator 6 and the water inlet heat exchange means 14, the exhaust gas is cooled in a condensor 44 to about 20° Co. Condensate formed is partly recycled via pump 34 and condensate recycling pipe 20 through heat exchange means 14 to the water inlet means 5. The other part of the condensate is supplied via pipe 45 to a space heating means (not shown).

The cool exhaust gas leaving the condensor 44 is supplied via duct 46 to the compressor 32 for compression to atmospheric pressure and release via release duct 33 and stack 18 to the atmosphere. The efficiency of the power generator system 37 of the invention is about 60%.

Although subsequent to the second condensing turbine 29 exhaust gas is to be compressed in compressor unit 32, still the efficiency is improved by about 2–4% because only a relatively small amount of dry and cool gas has to be compressed.

Figure 6:
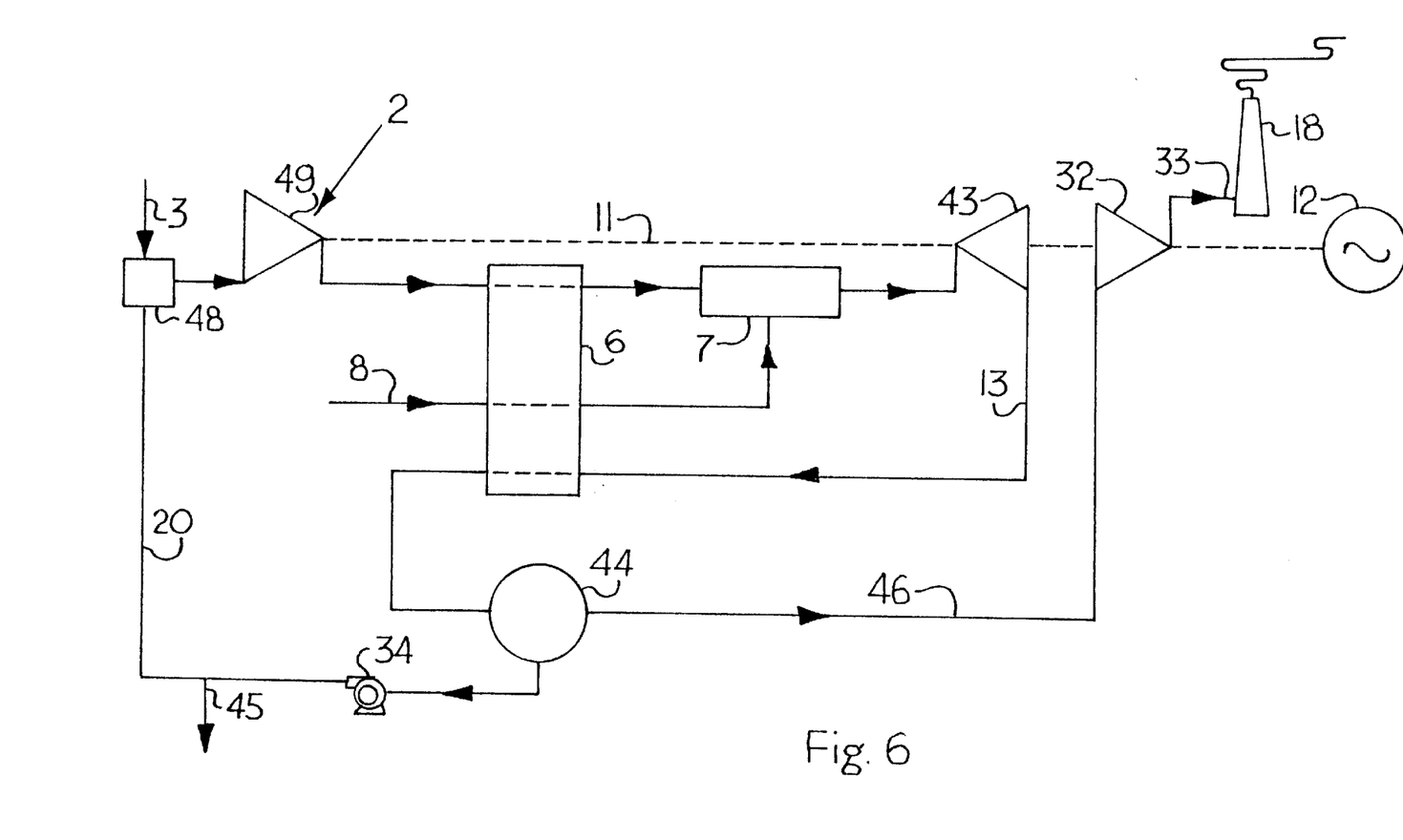
FIG. 6 represents schematically a preferred embodiment of the present invention.

Finally, FIG. 6 shows a power generating system 47 according to the present invention. The lay-out of this power system 47 is similar to that of the power system 37 shown in FIG. 5. Similar and equivalent unit operations and processes are referred to by the same reference numbers.

Condensate formed and separated in the condensor 44 (25° C.) is recycled via the condensate recycling pipe 20 directly to an atomizing unit 48. In this atomizing unit 48 condensate is atomized in air supplied via the air inlet 3. Air comprising atomized water (12–15 wt % on the oxygen containing gas in the form of droplets having a size of 1–5 $\mu$m) is supplied to the compressor 49 of the compressor means 2. Condensate is not preheated in order to avoid an increase of the compression energy. The power system 47 has an efficiency of about 59%.

In relation to the various illustrating embodiments it is noted, that although the turbines 10 and 43 and 16 (and if appropriate also 29) are mounted on a common shafts 11 together with the compressor means 2 and 32, and the generator 12, in equivalent embodiments these shafts may be split into respective separate shafts driving separate generators and compressor means.

Although lower hydrocarbon fuels, such as methane are preferred, other fuels may be used as well.

In relation to condensation it is noted that preferable condensation is carried out in several steps. In a first step a small amount of condensate is formed. This first amount of condensate is relatively contaminated with some salt and/or particulates and is therefore less suitable for use in the quasi-isothermal compression. The bulk of the condensate though is pure and can be used for this purpose and both the contaminated condensate and the surplus pure condensate are suitable for irrigation, etc.

It will be appreciated that various modifications of the present invention will be apparent to those skilled in the art from the foregoing description. Such modifications are intended to fall within the scope of the appended claims.

What is claimed is:

1. A system for power generation comprising a turbine system and a power generating system connected to said turbine system, wherein said turbine system comprises:

a) a compressor connected with an inlet for oxygen-containing gas, an outlet for compressed oxygen-containing gas and an inlet for supplying fluid to said compressor for cooling said oxygen-containing gas.

b) a combustor provided with a fuel inlet and a flue gas outlet, said combustor being connected with said outlet for compressed oxygen-containing gas of said compressor;

c) a gas turbine connected with said flue gas outlet of said combustor and being provided with an outlet for exhaust gases;

d) a recuperator connected with said outlet for compressed oxygen-containing gas of said compressor, and with said outlet for exhaust gases of said gas turbine, for mutual heat exchange;

e) at least one condensor for at least partially condensing water vapor from the exhaust gases from said gas turbine, said at least one condenser connected with said outlet for exhaust gases of said gas turbine and further provided with at least an outlet for condensate and an outlet for discharging the remaining gas, wherein said outlet for condensate is connected with said inlet for supplying fluid to said compressor for cooling said oxygen-containing gas; and f) a recompressor turbine for compressing the remaining gas from the at least one condensor.

2. The system as claimed in claim 1, wherein said condensate in said condensate outlet has a temperature of at least ambient.

3. The system as claimed in claim 1, wherein said condensate in said condensate outlet has a temperature of below ambient.

4. The system as claimed in claim 1, wherein said fluid is directly supplied to the oxygen-containing gas during and/or after compression and the cooling is essentially obtained by evaporation of said fluid.

5. The system as claimed in claim 1, wherein said condensate is injected into the oxygen-containing gas during and/or after compression by said compressor.

6. The system as claimed in claim 1, wherein said recuperator is further connected with said cold fuel inlet and to the fuel inlet of said combustor for heat exchange.

7. The system as claimed in claim 1, wherein at least part of the exhaust gases from said combustor are recycled to said inlet for oxygen-containing gas of said compressor.

8. The system as claimed in claim 1, wherein at least part of the exhaust gases from said condensor are recycled to a heat exchange means for heat exchange with said oxygen-containing gas supplied to said inlet for oxygen-containing gas of said compressor.

9. The system as claimed in claim 8, wherein at least part of the exhaust gases from said condensor are directly recycled to said inlet.

10. The system as claimed in claim 1, wherein the exhaust gases from a first turbine are further expanded in at least a second turbine.

11. The system as claimed in claim 1, wherein at least part of the exhaust gases from the turbine system are expanded to 2.0–0.8 bara.

12. The system as claimed in claim 1, wherein relatively cold condensate or gas is applied for cooling purposes.

13. The system as claimed in claim 1, wherein heat developed is applied for heating purposes.

14. The system as claimed in claim 1, wherein said inlet for fluid comprise means for atomizing said fluid in the oxygen-containing gas.

15. The system is as claimed in claim 14, wherein said fluid is atomized in an amount of up to 12–15% by weight on the oxygen containing gas in the form of droplet having a size of about 1–5 $\mu$m.

16. A system for power generation comprising a turbine system and a power generating system connected to said turbine system, wherein said turbine system comprises:

a) a compressor connected with an inlet for oxygen-containing gas and a inlet for supplying fluid to said compressor for cooling said oxygen-containing gas;

b) a combustor provided with a fuel inlet and a flue gas outlet, said combustor being connected with said outlet for compressed oxygen-containing gas of said compressor;

c) a gas turbine connected with said flue gas outlet of said combustor and being provided with an outlet for exhaust gases;

d) a recuperator connected with said outlet for compressed oxygen-containing gas of said compressor, and with said outlet for exhaust gases of said gas turbine, for mutual heat exchange; and e) at least one condensor for least partially condensing water vapor from the exhaust gases from said gas turbine, said at least one condensor including at least one condensing turbine connected with said outlet for exhaust gases of said gas turbine and further provided with at least an outlet for condensate and an outlet for discharging the remaining gas, wherein said exhaust gases from said gas turbine are expanded in the at least one condensing turbine, wherein said exhaust gases from said gas turbine pass through said recuperator and are expanded in at said at least one condensing turbine.

17. The system as claimed in claim 16, wherein at least part of the exhaust gases from the turbine system are expanded to 0.2–0.8 bara.

18. The system as claimed in claim 16, wherein the outlet for condensate is coupled with said inlet for supplying fluid to said compressor.

19. The system as claimed in claim 16, wherein said condensate in said condensate outlet has a temperature between about 1–15° C.

* * * * *

UNITED STATES PATENT AND TRADEMARK OFFICE
CERTIFICATE OF CORRECTION

PATENT NO. : 6,263,661 B1
DATED : July 24, 2001
INVENTOR(S) : Maarten J. van der Burgt et al.

It is certified that error appears in the above-identified patent and that said Letters Patent is hereby corrected as shown below:

Column 3,
Line 13, "(55020 C.)" should read -- 550 C.) --.
Line 61, "(2520 C.)" should read -- (25 C.) --.

Column 4,
Line 11, "20 Co." should read -- 20 C. --.

Column 5, claim 1,
Line 4, after "gas" delete period and insert semicolon -- (;) --.

Column 5, claim 7,
Line 45, "combustor" should read -- condensor --.

Column 6, claim 11,
Line 3, "2.0-0.8" should read -- 0.2-0.8 --.

Column 6, claim 15,
Line 12, "system is as claimed" should read -- system as claimed --.

Column 6, claim 16,
Line 20, "and a inlet" should read -- and an inlet --.

Signed and Sealed this

Ninth Day of April, 2002

*Attest:*

*Attesting Officer*

JAMES E. ROGAN
*Director of the United States Patent and Trademark Office*